June 23, 1953 — Z. STUBELEK — 2,642,618
FOWL SCALDING MACHINE
Filed May 8, 1952 — 2 Sheets-Sheet 1
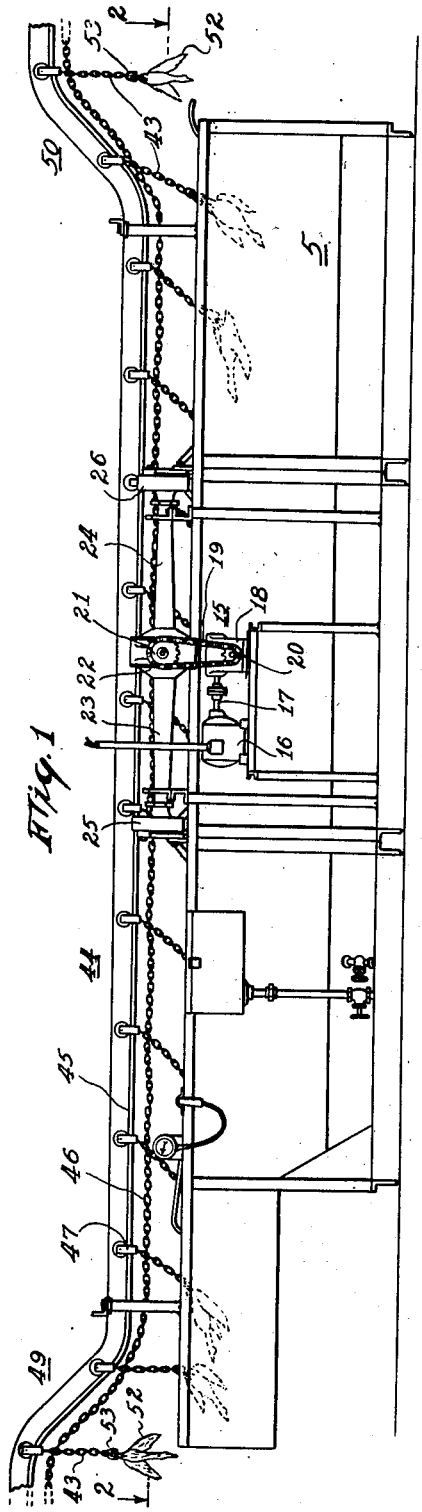
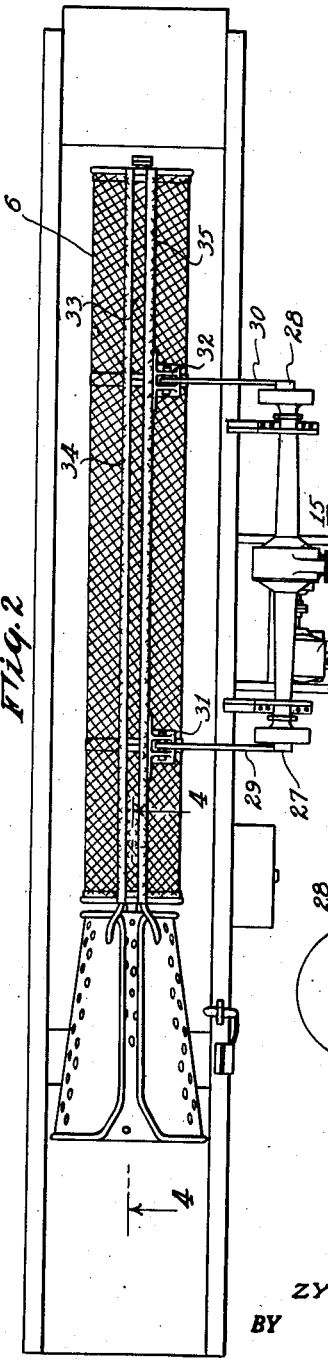
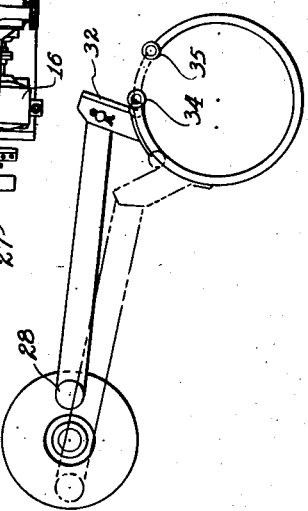
INVENTOR.
ZYGMENT STUBELEK
BY
ATTORNEY June 23, 1953  Z. STUBELEK  2,642,618
FOWL SCALDING MACHINE
Filed May 8, 1952  2 Sheets-Sheet 2
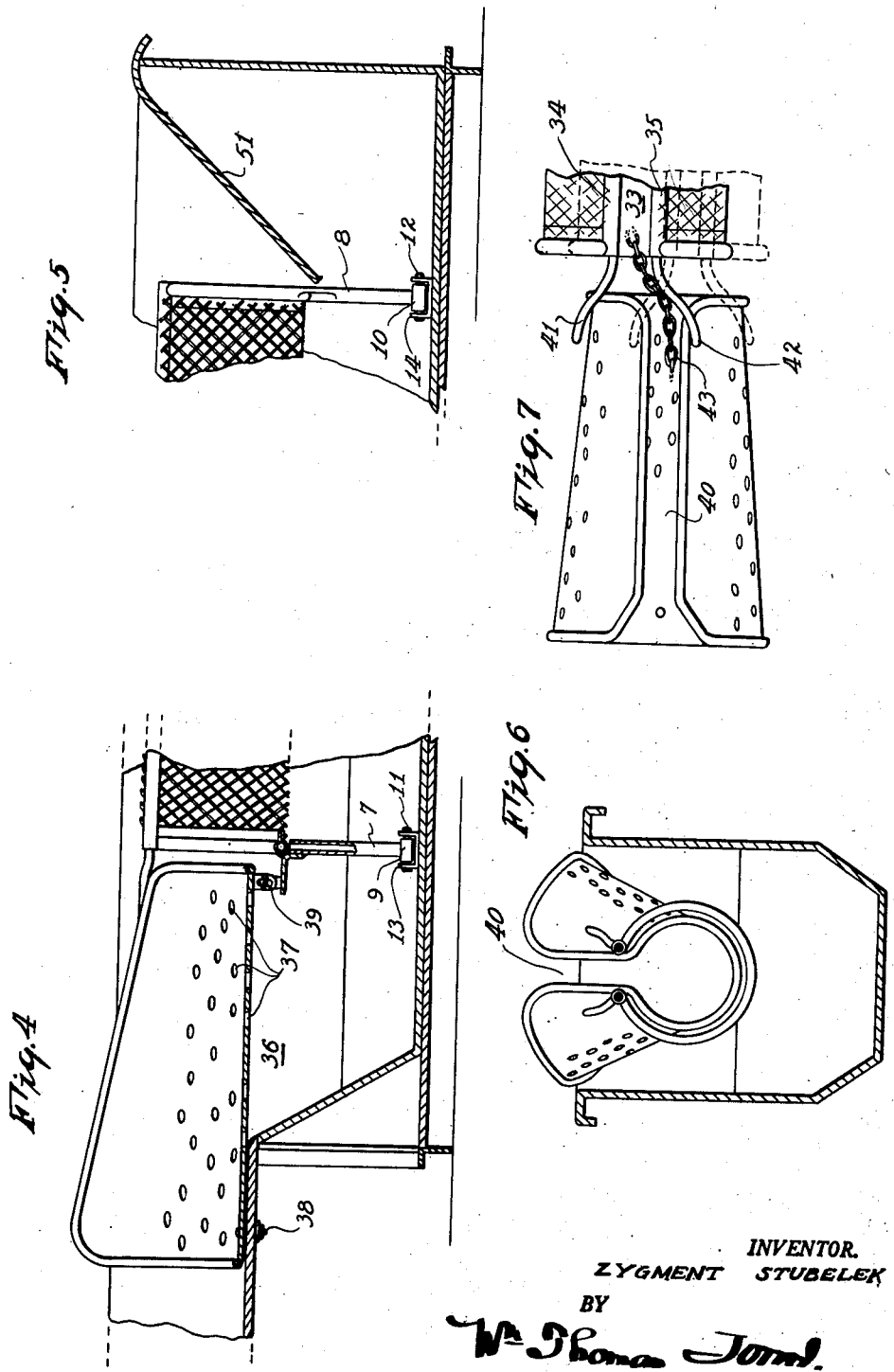
INVENTOR.
ZYGMENT STUBELEK
BY
ATTORNEY Patented June 23, 1953

2,642,618

UNITED STATES PATENT OFFICE 2,642,618

FOWL SCALDING MACHINE

Zygment Stubelek, Southampton, N. Y.

Application May 8, 1952, Serial No. 286,785

7 Claims. (Cl. 17—11.2)

My invention relates to an improved machine for scalding fowls.

Conventional apparatus of this general type possess many inherent disadvantages, among which it is not deemed amiss to mention improper scalding due to incomplete saturation of feathers; improper submersion of fowls; tightly cramming of fowls into receptacles whereby only portions of the feathers are subjected to total saturation; bruising and similar injury to fowls resulting from violent agitation or powerful surges or currents of water; and finally, the non-adaptability of the present day machines to modern methods of processing, which by way of example, include an overhead trolley conveyor.

I have eliminated the foregoing disadvantages by providing an elongated trough enclosing an oscillatible receptacle having an opening along its top and combined with a submerging hopper and an overhead trolley conveyor, whereby through suitable flexible connections depending from the conveyor, the fowls, carried at the lower terminals of the connections are first thoroughly submerged in the scalding water, then impelled through the opening at a predetermined speed longitudinally within the receptacle, as the latter is rocked from side to side to set up a counter circulation of the water. A unique dipping action of the fowls is also incorporated. Thus, succinctly described, is the machine which insures the emerging of the birds at the discharge end thereof in a completely scalded condition and in admirable shape for subsequent picking.

To the accomplishment of the recited objects and others co-ordinate therewith, one of the embodiments of my invention resides in the construction and arrangement of parts shown in the accompanying drawings, described in the following specification and embraced within the scope of the appended claims.

In said drawings:

Fig. 1 is a side elevation of the machine embodying my invention, and

Fig. 2 is a top plan view thereof.

Fig. 3 is a detailed end elevation of the receptacle and one of the fly wheels and showing the crank-arm connection therebetween.

Fig. 4 is an enlarged fragmentary section taken along lines 4—4 of Fig. 2 illustrating the submerging hopper.

Fig. 5 is an enlarged fragmentary section of the discharge end of the trough.

Fig. 6 is a rear end elevation of the hopper within the trough, the latter being shown in section.

Fig. 7 is a top plan view of the hopper, the adjacent end of the receptacle and the intermediate guiding fingers.

Referring more particularly to the drawings, 5 designates an elongated trough or tank enclosing a cylindrical reticulated receptacle or basket 6 having its opposite ends open, said receptacle or basket being supported at opposite ends by the connecting rods 7—8. In turn, the lower terminals 9—10 of these rods are pivoted to bearings 11—12 sustained by U-shaped brackets 13—14 secured to the bottom of the trough. Medially of the longitudinal extent of the receptacle—see Figs. 1 and 2—is mounted suitable oscillating mechanism denoted generally by the reference character 15, and comprising a motor 16, with its shaft 17 connected to a reduction gear 18, a chain 19 being trained over the sprocket 20 of the latter and the sprocket 21 extending laterally from the differential housing 22 such as is commonly employed in the rear end construction of an automobile. The outer ends of the axle sections contained within tubular housings 23—24, but not shown, are formed with fly wheels 25—26, and pivoted eccentrically to these are the outer ends 27—28 of crank-arms 29—30, the opposite ends of the arms being similarly pivoted to brackets 31—32 fixed to the top edges of receptacle 6.

Receptacle 6, as previously stated, is shown as being reticulated, although it may be constructed from perforated sheet metal or in any other equivalent form. In any event, it is preferred that the top of the receptacle be longitudinally slotted, as at 33, and that the opposite sides of the slot be equipped with parallel rounded edgings 34—35.

At the forward end of the trough and immediately in advance of the receptacle is a submerging hopper 36, as exhibited in Figs. 2, 4 and 6. It is partially perforated, as at 37 and has its base pivoted at opposite ends 38 and 39, so that it may move in consonance with the receptacle. Moreover, the top of the hopper has a longitudinal slot 40 coinciding with the slot of the receptacle.

Projecting forwardly from the edgings 34—35 of the receptacle are a pair of divergent guides or fingers 41—42 which direct the chains 43 from the hopper to the receptacle without fear of their becoming clogged or caught between the confronting terminals of the hopper and receptacle —note Figs. 4, 6 and 7.

Operating in conjunction with the mechanism hereinbefore described, is an overhead conveyor system 44, as shown in Fig. 1. It consists of the usual track 45, conveyor chain 46, trolley assembly 47 and depending chains 43 spaced at suitable intervals. Opposite ends 49—50 of the track 45 are inclined upwardly to ease the passage of fowls as they are introduced and discharged from the machine, and at the discharge end this idea is further carried out by the addition of an inclined baffle plate 51—see Fig. 5.

After leaving the killing room, the fowls 52 are impaled to shackles 53 carried by chains 43. Following the dip 49 of track 45, the fowls are gradually lowered into the forward end of tank 5, it being understood that the tank is partially filled with water; that the temperature of the water is automatically maintained close to the boiling point; and that motor 16 has been energized. Chains 43 are threaded through slot 40 of the hopper and thus being initially submerged, the fowls are directed into receptacle 6, the chains which are relatively slack, continuing along through slot 33 of the receptacle. By virtue of the mechanism 15, the receptacle 6 is oscillated. Simultaneously, edgings 34—35 impinge against chains 43. Thus we have, in addition to the normal resistance of the water, which is offered by the fowls being impelled therethrough, a swirling action produced by the rocking of the receptacle and a unique raising and lowering movement of the fowls—which may be likened unto dipping—and manifestly due to the edgings engaging the chains upon each oscillation of the receptacle. In their unification, these movements produce a maximum circulation of water and thereby serve to completely scald the birds. Also of importance is the fact that none of the characteristics of my machine subject the fowls to violent actions or strains, and thus render them unfit for the market. Still further, the machine is adapted to scalding fowls as they progress along on an overhead trolley conveyor—it is designed essentially to assembly line methods of processing fowls on a mass production basis.

In its broader aspects my invention comprehends the employment not only of the various means described but of equivalent means for performing the recited functions. It is desired to reserve the right to effect such changes and modifications of the invention as may come fairly within the scope of the appended claims.

I claim:

1. A device for scalding fowl comprising an elongated container for liquid having an open top, a reticulated receptacle in said container and being of less length and width than said container, supporting means connected to said receptacle and pivotally connected to a bottom portion of said container, and power operated means connected to a top portion of said receptacle for oscillating the same.

2. A device for scalding fowl comprising an elongated container for liquid having an open top, a reticulated receptacle in said container and being of less length and width than said container, a longitudinal slot extending the entire length of the top of said receptacle, the receptacle being open at both ends, supporting means connected to said receptacle and pivotally connected to a bottom portion of said container and power operated means connected to a top portion of said receptacle for oscillating the same.

3. A device for scalding fowl comprising an elongated container for liquid having an open top, a reticulated receptacle in said container and being of less length and width than said container, a longitudinal slot extending the entire length of the top of said receptacle, the receptacle being open at both ends, a hopper mounted at one end of the container adjacent to one end of the receptacle and having a longitudinal slot extending the entire length of the top coinciding with the slot in the receptacle, supporting means connected to said receptacle and pivotally connected to a bottom portion of said container, and power operated means connected to a top portion of said receptacle for oscillating the same.

4. A device for scalding fowl comprising an elongated container for liquid having an open top, a reticulated receptacle in said container and being of less length and width than said container, a longitudinal slot provided with rounded edgings at its opposite sides, said slot extending the entire length of the top of the receptacle, the receptacle being open at both ends, a hopper mounted at one end of said container adjacent one end of the receptacle and having a longitudinal slot extending the length of its top and coinciding with the slot in the receptacle supporting means connected to said receptacle and pivotally connected to a bottom portion of said container, and power operated means connected to a top portion of said receptacle for oscillating the same.

5. A device according to claim 4 wherein a pair of diverging guides are mounted at opposite sides of the longitudinal slot of the receptacle intermediate said slot and the slot of the hopper.

6. In a machine for scalding fowl having a travelling conveyor disposed above the machine, and flexible fowl carrying and suspending means depending from the conveyor, an elongated container for liquid having an open top, a reticulated receptacle in said container and being of less length and width than said container, a longitudinal slot extending the entire length of the top of said receptacle, the receptacle being open at both ends, supporting means connected to said receptacle and pivotally connected to a bottom portion of said container, and power operated means connected to a top portion of the receptacle for oscillating the same, the lower ends of the flexible carrying and suspending means depending through the longitudinal slot of the receptacle and into the receptacle.

7. A machine according to claim 6 wherein the power operated means for oscillating the receptacle comprises, in combination, a motor, having its shaft connected to a reduction gear provided with a sprocket, a chain trained over the said sprocket, a differential housing extending laterally of said sprocket, provided at opposite ends with fly wheels, connected eccentrically to the outer ends of crank arms, the inner ends of said arms being pivoted to the top portion of the receptacle for rocking the receptacle at right angles to the axis of the container.

ZYGMENT STUBELEK.

References Cited in the file of this patent

UNITED STATES PATENTS

| Number | Name | Date |
|---|---|---|
| 1,672,555 | Barker et al. | June 5, 1928 |
| 1,770,565 | Anderson | July 15, 1930 |
| 1,977,542 | Bruce | Oct. 16, 1934 |
| 2,001,813 | Bouda | May 21, 1935 |